United States Patent [19]

Burns

[11] Patent Number: 5,682,954
[45] Date of Patent: Nov. 4, 1997

[54] UPPER HITCH LINK ELECTRONIC DRAFT SENSING

[75] Inventor: Stephen E. Burns, Mazon, Ill.

[73] Assignee: Case Corporation, Racine, Wis.

[21] Appl. No.: 711,199

[22] Filed: Sep. 10, 1996

[51] Int. Cl.⁶ .................................................. A01B 63/12
[52] U.S. Cl. ........................................ 172/7; 172/239
[58] Field of Search .............................. 172/2, 3, 4, 4.5, 172/6, 7, 9, 10, 239, 430; 180/290; 364/150, 424.07

[56] References Cited

U.S. PATENT DOCUMENTS

| | | | |
|---|---|---|---|
| 3,768,568 | 10/1973 | Pitsch | 172/7 |
| 3,825,072 | 7/1974 | Collins | 172/7 |
| 4,304,303 | 12/1981 | Lange . | |
| 4,640,368 | 2/1987 | Kittle et al. . | |
| 4,807,136 | 2/1989 | Rutkowski et al. | 172/7 X |
| 5,109,707 | 5/1992 | VanGerpen . | |
| 5,178,220 | 1/1993 | Cevolini et al. . | |
| 5,452,766 | 9/1995 | Imamura et al. . | |
| 5,584,347 | 12/1996 | Bennett . | |

FOREIGN PATENT DOCUMENTS

| | | |
|---|---|---|
| 0 036 203 | 8/1984 | European Pat. Off. . |
| 0 076 611 | 3/1986 | European Pat. Off. . |
| 0 088 915 | 8/1986 | European Pat. Off. . |
| 0 238 875 | 8/1989 | European Pat. Off. . |
| 3929487 | 3/1990 | Germany . |
| 3-065121 | 3/1991 | Japan . |

*Primary Examiner*—Terry Lee Melius
*Assistant Examiner*—Robert Pezzuto
*Attorney, Agent, or Firm*—Foley & Lardner

[57] ABSTRACT

A draft control mechanism for a tractor having a three-point hitch for attachment of a ground-engaging implement. The draft control mechanism utilizes an upper link arm connected to the tractor with a single load pin which houses a strain sensor for generating the control signals to control a lift mechanism connected to the implement. The pin is attached between two flanges of an upper link bracket to the rear of the tractor. Each flange includes a bushing surrounding the portion of the pin disposed therein. The pin includes a pin extension protruding from the outer side of one of the bracket flanges. A sealing cover is disposed over the pin extension with a rotation stop to restrict pin rotation.

13 Claims, 4 Drawing Sheets

5,682,954

UPPER HITCH LINK ELECTRONIC DRAFT SENSING

FIELD OF THE INVENTION

The present invention relates to a device for sensing force exerted on an implement coupled to a work vehicle.

BACKGROUND OF THE INVENTION

Various systems are known for coupling implements to work vehicles such as agricultural tractors. One such system is the three-point hitch commonly found on a variety of off road vehicles, including agricultural tractors, construction tractors, back hoes and the like. In such vehicles, it is generally known that as the force or draft load applied to a ground-engaging implement being drawn or pushed by the work vehicle increases significantly, the vehicle wheels may begin to slip and the vehicle may become stuck or stall. However, this force or draft load, typically caused by the resistance of the ground will vary depending on such factors as the hardness of the ground, its material consistency, the depth of penetration of the implement and so forth.

Accordingly, control devices are used with work vehicles, such as agricultural tractors and machines to allow the position of the implement being drawn or pushed to be automatically controlled, at least in part, on the basis of the detection of the force being applied to the implement. Automatic control is used to distribute the power of the machine correctly between the function of drawing, pushing or supporting the implement, and the function of positioning the implement at a predetermined position, typically the depth of penetration in the ground being worked. By way of example, such controls may use electronic pins mounted to one or both lower draft links of a three-point hitch to sense draft force.

There are a variety of sensing and control devices available for providing the necessary control of implements coupled to work vehicles. However, these devices are typically mechanically complex, are expense to manufacture, and have electronics prone to failure. Accordingly, it would be desirable to reduce the mechanical complexity and quantity of sensors used in the control of agricultural implements such as plows.

SUMMARY OF THE INVENTION

The present invention provides a control device for lifting or lowering an implement attached to a work vehicle such as an agricultural tractor. The device includes a lift mechanism attached at one end to the work vehicle, and at the other end to the implement. The device further includes a load pin with an electronic strain sensor disposed therein. The sensor generates a signal indicative of the force being applied to the pin. The device further includes an upper link bracket disposed on the work vehicle, with the pin fixed to the upper link bracket and disposed in a direction perpendicular to the direction of the force applied to the implement when pulled by the vehicle. The device further includes at least one upper link arm disposed parallel to the force, with the upper link arm attached at one end thereof to the implement at a location on the implement which is above the point of attachment of the lift mechanism to the implement, and with the other end of the upper link arm pivotally mounted on the single pin so that the force is applied through the upper link arm directly to the pin and the electronic sensor.

In one embodiment of the present invention, the electronic sensor is preferably of a type which can measure both positive and negative strain applied to the pin.

preferably, the pin has an extension protruding beyond the upper link bracket at one end thereof, and the electronic sensor includes a wire which exits the pin extension to provide the sensor signal to a controller. Additionally, a sealing cover may be disposed over the pin extension and the wire. The pin extension is configured in the preferred embodiment to have at least two generally flat surfaces on opposite sides thereof, and the cover may include at least two generally flat opposing surfaces spaced apart so that the two flat surfaces of the pin extension fit in close adjacency between the opposing surfaces of the cover as a rotation stop.

The lift mechanism of the control device may include, in one embodiment, at least one lower link arm with one end thereof attached to the work vehicle and with the other end thereof attached to the implement at an attachment point below the upper link arm attachment point. The lift mechanism may further include a lift arm attached at one end to the work vehicle and attached at its other end to the lower link arm. Additionally, the implement may include a generally vertical mast with the upper and lower link arms attached to different attachment points on this mast.

The preferred embodiment of the upper link bracket may include two flanges, with the pin mounted therebetween and with the pin extension protruding from the outer side of one of these flanges. A bushing may be included within each of the flanges surrounding the portions of the pin mounted therein.

DETAILED DESCRIPTION OF THE PREFERRED EMBODIMENT

Figure 1:
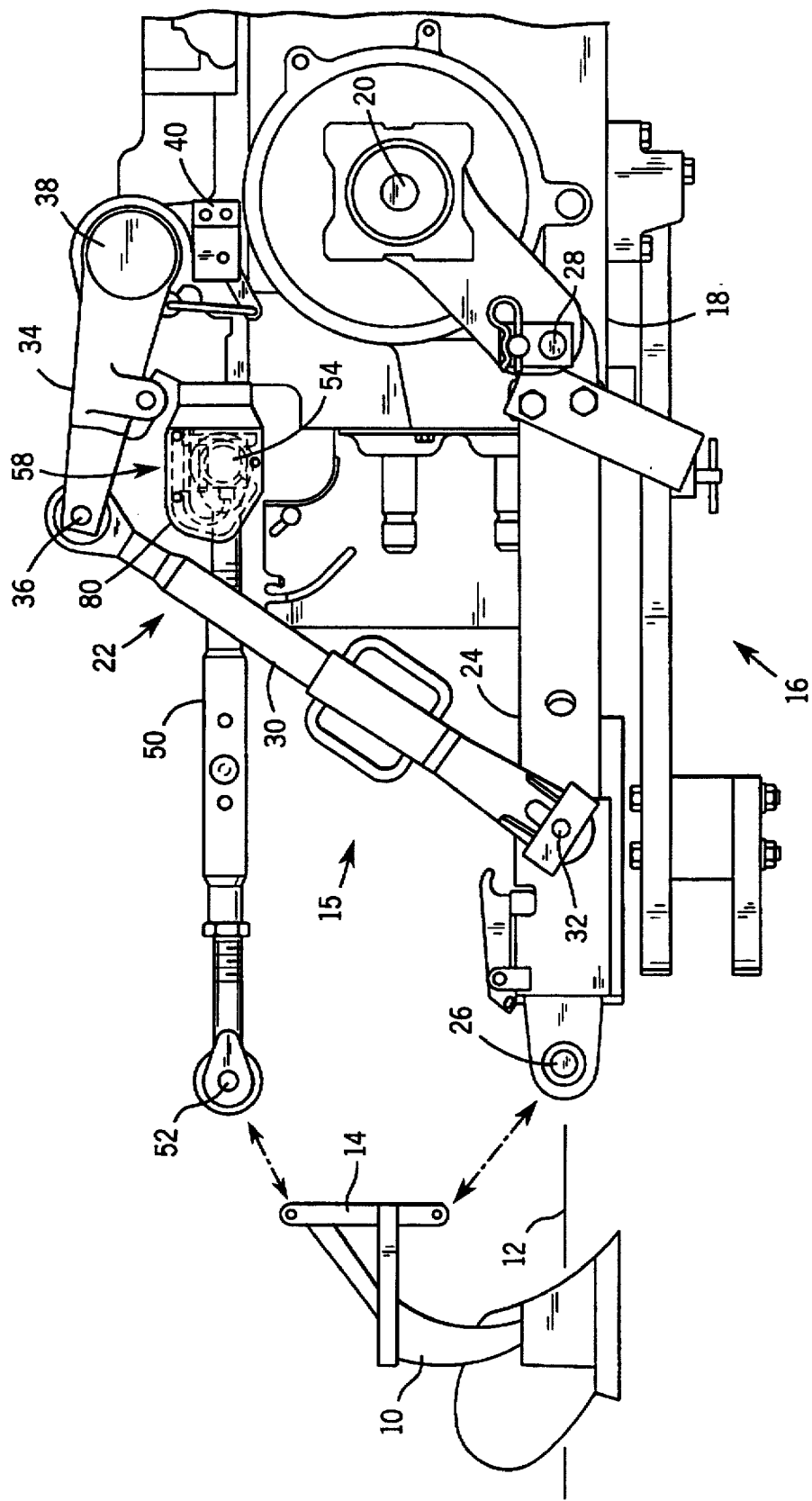
FIG. 1 is a schematic side view of one embodiment of an implement support assembly such as a three-point hitch.

Referring now to FIG. 1, a working implement 10 (e.g. plow) for engagement with the ground 12 includes a generally vertical member 14. An associated work vehicle 15 (e.g. tractor) attached to implement 10 is partially shown. A portion 18 of the body of vehicle 15 and the associated rear axle 20 for vehicle 15 is also shown. For purposes of clarity, only the components of the height control mechanisms 16 of the work vehicle 15 are shown in detail.

The implement height control includes a lift mechanism 22 (e.g. three-point hitch). Mechanism 22 includes a pair of lower arms 24, a pair of telescoping lift arms 30, and a pair of rockshaft arms 34. Arms 24 are pivotally attached to body 16 of vehicle 15 by respective pins 28. At their other ends, arms 24 are pivotally connected to the mast 14 of the implement 10 by respective pins 26. Telescoping arms 30 are pivotally connected to respective arms 24 by respective pins 32. The other ends of arms 30 are pivotally connected to rockshaft arms 34 by pins 36. The opposing ends of rockshaft arms 34 are pivotally connected to vehicle 15 by a rockshaft 38. A rockshaft position sensor assembly 40 uses a potentiometer to generate a signal representative of the position of rockshaft arms 34 and the associated implement 10.

Figure 2:
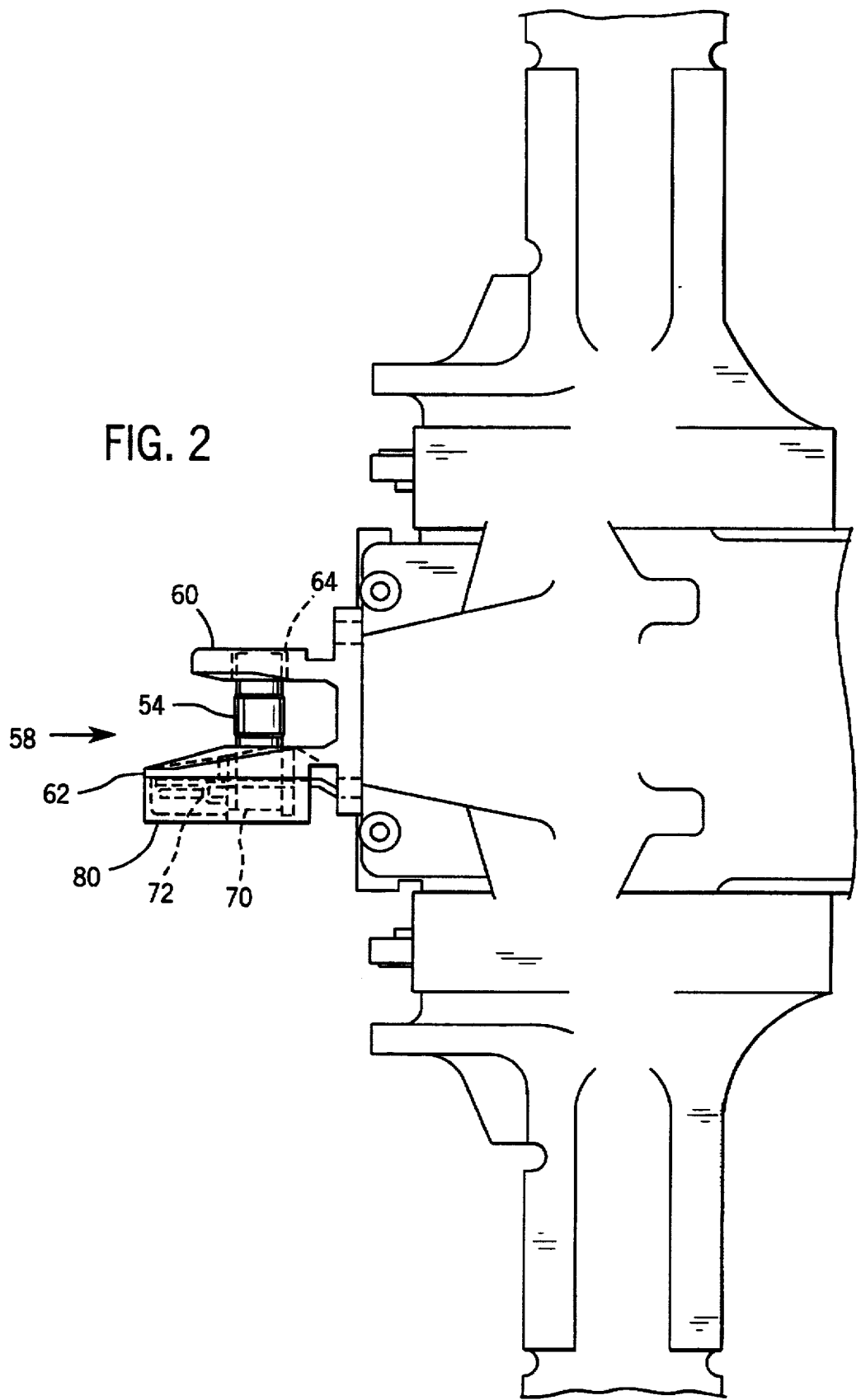
FIG. 2 is a top view of a portion of FIG. 1 showing the details of an upper link bracket and a load pin of the assembly.
Figure 3:
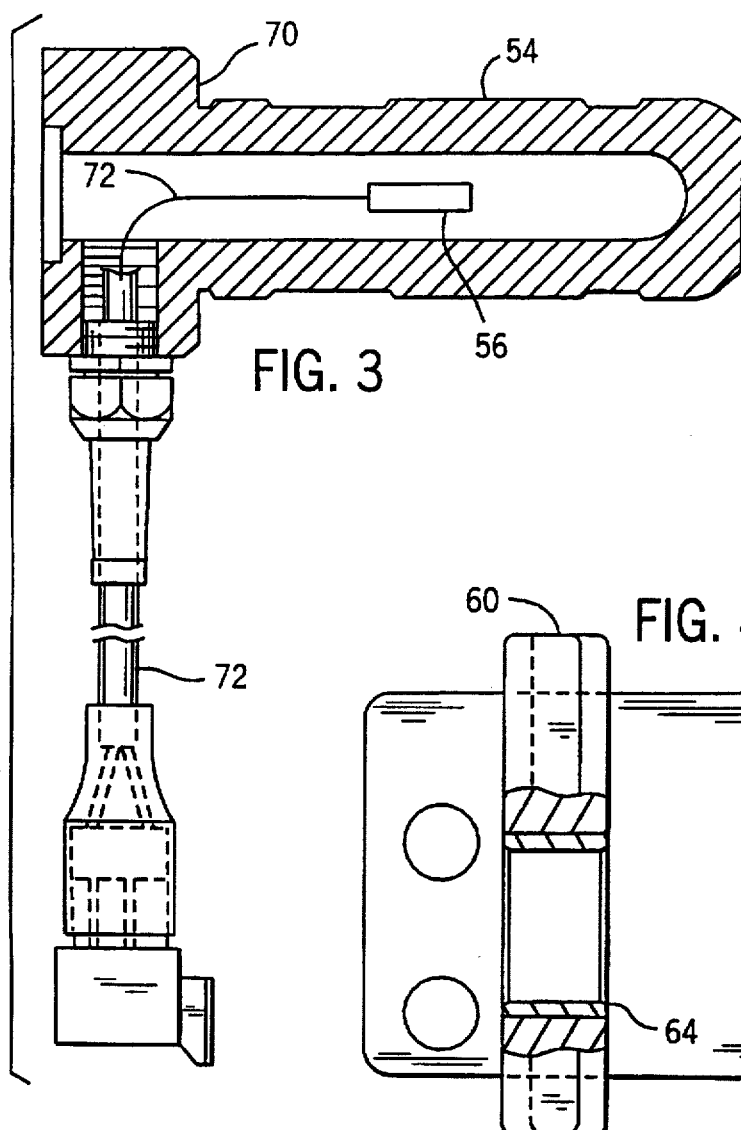
FIG. 3 is a schematic side view of the load pin and associated electrical conductor.

Mechanism 22 also includes an upper link arm 50, which is pivotally connected at one end thereof to the mast 14 by a pin 52. The other end of upper link arm 50 is pivotally connected to the vehicle body by a load pin 54. Load pin 54 is hollow and contains an electronic strain sensor 56 (see FIG. 3). (The FIG. 3 depiction of pin 50 and sensor 56 are reversed from FIG. 2.) The arrangement of lift mechanism 22 and load pin 54 provides implement load sensing based upon a single load pin.

Figure 4A:
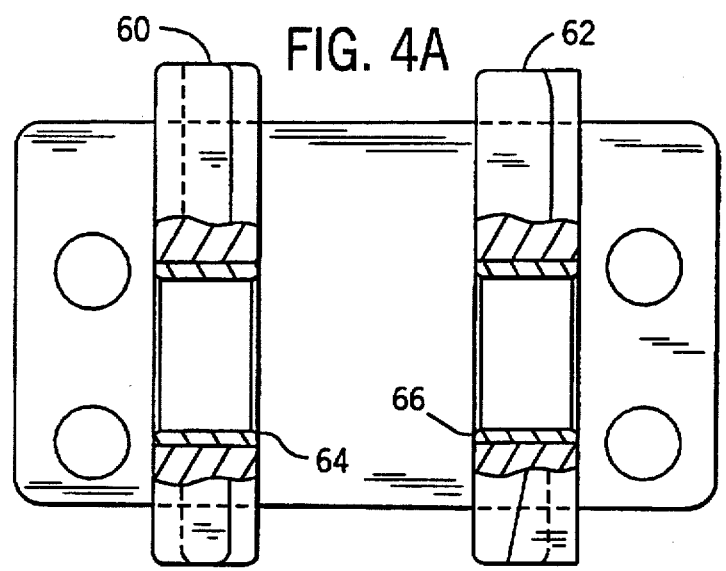
FIG.4A is a schematic back view of an upper lift bracket which may be utilized as a component of the assembly.
Figure 4B:
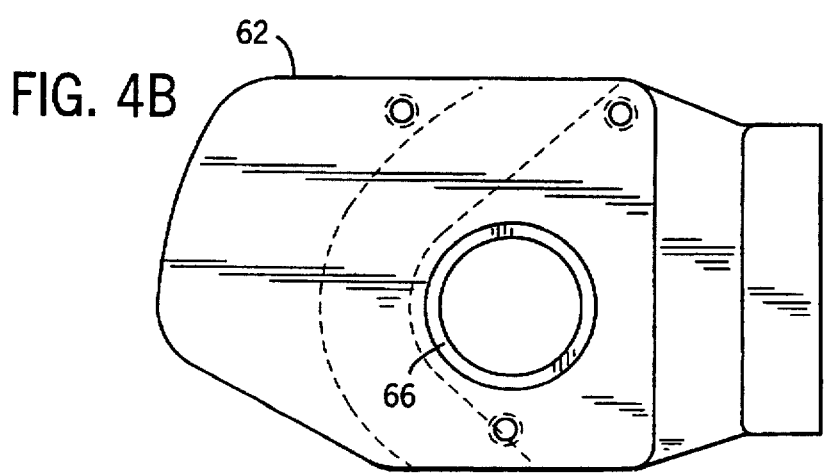
FIG. 4B is a schematic side view of the upper lift bracket of FIG. 4A.

Pin 54 is connected to the vehicle 18 at an upper arm bracket 58. Bracket 58 is shown most clearly in the top view of FIG. 2, and includes two flanges 60 and 62, with pin 54 mounted therebetween and extending therethrough with its longitudinal axis perpendicular to the longitudinal axis of member 50. Flanges 60 and 62 include respective bushings 64 and 66 to eliminate or reduce wear on the pin 54 if rotation thereof occurs. Bushings 64 and 66 are shown most clearly in FIGS. 4A and 4B. Bushings 64 and 66 may be, by way of example, approximately 2 millimeters in thickness and fabricated from steel having a hardness of 55–60 Rockwell.

Pin 54 further includes a pin extension 70 which protrudes beyond the outer side of one of flanges 60 and 62. Referring to FIGS. 2 and 3, pin extension 70 extends from the outer side of bracket flange 62, and rests against the outer side of the flange 62.

Referring now more particularly to FIG. 3, pin 54 is shown with an electronic strain sensor 56 disposed in the hollow thereof. A wide variety of strain or deformation sensors may be utilized to implement the sensor 56. By way of example, a strain sensor part no. 1964916C3 from BLH Company may be utilized. It is preferred that the strain sensor 56 be capable of measuring both positive and negative strains which correspond to tension and compression loads in member 50. Thus, discussed in further detail below, sensor 56 is configured and oriented in pin 54 to generate a load signal which represents both tension and compression loads in member 50.

In FIG. 3, a wire 72 conducts a load signal indicative of the positive or negative strain J sensed by strain sensor 56 to the exterior of pin 54. The load signal is applied to an electronic hitch control (not shown). A wide variety of different configurations may be utilized to implement this control function. For example, a control system may be utilized that controls electronic solenoid valves which control fluid flow into and out of the hydraulic cylinder(s) which rotate rockshaft 38 to raise or lower lower lift arms 24 in accordance with a control signal based upon the load signal generated by pin 54. In this regard, the electronic control may be a control system of the type described in U.S. Pat. No. 5,421,416 issued to Orbach, et al. which is hereby incorporated by reference. This patent discloses a hitch control which could provide hitch control based upon the load signal generated by pin 54. U.S. Pat. No. 5,472,056 provides additional information on a system for using a draft signal for hitch control, and is also hereby incorporated by reference.

Referring again to FIGS. 1 and 2, sealing cover 80 is disposed over and around pin extension 70 and wire 72 in order to retain pin 54 within the flanges 60 and 62. Cover 80 also protects pin 54 and wire 72 from degradation due to the effects of dirt, water, oil, etc. Cover 80 prevents movement of wire 72 at the junction with pin extension 70 to eliminate fatigue failure of the wire at this junction. Cover 80 also operates to retain pin 54 in bracket 58, and prevents rotation of pin 54 in bracket 58. By maintaining pin 54 in a fixed orientation with respect to bracket 58, the orientation of strain sensor 56 is also fixed to provide consistent load pin signals. Cover 80 is shown in more detail in FIGS. 5A and 5B.

Figure 5A:
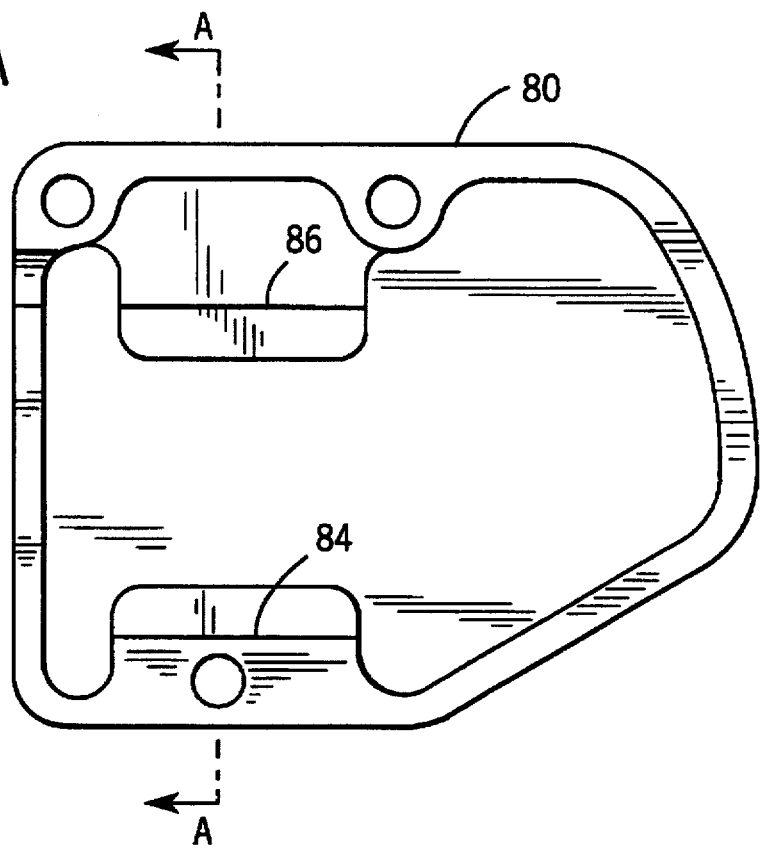
FIG. 5A is a schematic side view showing the inside of a sealing cover of the load pin.
Figure 5B:
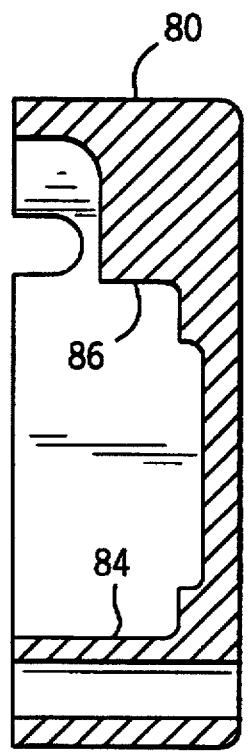
FIG. 5B is a cross-sectional view of the sealing cover of FIG. 5A taken along the section line A—A.

In a preferred embodiment, cover 80 includes surfaces therein to provide a rotation stop for pin 54. In FIG. 5A, this rotation stop is shown as comprising at least two generally flat opposing surfaces 84 and 86 spaced apart so that two generally flat surfaces on pin extension 70 fit in close adjacency between opposing surfaces 84 and 86 of the cover 80. It is to be understood that there are a variety of mechanical arrangements for effecting a rotation stop that could be utilized in place of the flat opposing surfaces shown in FIG. 5.

It should be noted that a particular cause of failure for the strain gauge sensor pins in the prior art was the failure to obtain proper strain pin orientation and to retain that pin orientation of the pin throughout the life of the pin. Additionally, pin failure was caused by the inability of the prior art to prevent moisture from seeping into the electronic circuitry of the pin. Cover 80 configured to insure this retention of the proper orientation by the pin while maintaining the pin in a dry condition.

The present pin and cover assembly is particularly advantageous for use with fully mounted 3-point hitches useable with ground-engaging implements to permit lowering and raising of those ground-engaging implements with respect to the ground. More specifically, the draft load from the implement is transferred through member 50 to pin 54 containing strain gauge sensor 56 which generates a load pin signal representative of the load at implement 10. Based upon this signal, the associated electronic control controls an analog or PWM signal to the hydraulic valve solenoids which control the hydraulic cylinders which rotate rockshaft 38 to raise and lower implement 10. For example, the electronic control may cause hitch 10 to be raised when the signal generated by pin 54 represents a compressive force in member 50. Accordingly, the present invention reduces the mechanical complexity of the draft or attitude control feedback arrangement (e.g. single pin 54) and thus reduces the manufacturing cost of such a system. Other modifications and variations of the present invention are possible in light of the above teachings. It is therefore to be understood that within the scope of the appended claims, the invention may be practiced otherwise than one specifically described.

What is claimed is:

1. A lifting mechanism for being controlled by a hitch control to raise and lower a work implement that is attached to a work vehicle, the mechanism comprising:

a first member attached at one end to the work vehicle, and at the other end to the implement;

a load pin having an axis and a sensor configured to generate and provide a signal representative of the loads generated in the load pin to the hitch control;

an upper link bracket disposed on the work vehicle, with the pin fixed against rotation about the axis to the upper link bracket and disposed in a direction perpendicular to the direction of the force;

an upper link arm disposed between the implement and vehicle, the upper link arm having a first end and a second end, wherein the first end is attached to the implement at a location on the implement which is above the first member, and wherein the second end of the upper link arm is pivotally mounted on the load pin to apply forces generated in the upper link arm to the load pin to generate load therein.

2. The mechanism of claim 1, wherein the sensor includes an electronic strain sensor configured to sense and measure both loads in the load pin representative of tension and compressive loads in the upper link arm.

3. The mechanism of claim 1, wherein the load pin further comprises:

a pin extension protruding beyond the upper link bracket at one end thereof and wherein the sensor includes an electrical coupling which exits the pin extension to provide the signal to the hitch control; and a sealing cover disposed over the pin extension and the electrical coupling.

4. The mechanism of claim 3, wherein the pin extension has at least two generally flat surfaces on opposite sides thereof, and wherein the cover includes at least two generally flat opposing surfaces therein spaced apart so that the two generally flat surfaces of the pin extension fit in close adjacency between opposing surfaces of the cover.

5. The mechanism of claim 4, further comprising:

a second member with one end thereof attached to the work vehicle and with the other end thereof attached to the implement at an attachment point below the upper link arm attachment point; and a lift arm having a first end attached to the work vehicle and a second end attached to the second member.

6. The mechanism of claim 5, wherein the implement includes an approximately vertical mast, with the first and second members, and the upper link arm being attached to attachment points on the mast.

7. The mechanism of claim 6, wherein the first and second members, and the upper link arm are attached to the work vehicle at the rear thereof.

8. The mechanism of claim 1, wherein the upper link bracket comprises two flanges, with the pin mounted therebetween, and the pin extension protruding from one of the flanges; and a bushing within each of the flanges surrounding a portion of the pin mounted therein.

9. The mechanism of claim 3, wherein the cover includes a rotation stop therein for preventing rotation of the pin.

10. The mechanism of claim 9, wherein the upper link bracket comprise two flanges, with the pin mounted therebetween, and the pin extension protruding from the flanges; and a bushing within each of the flanges surrounding a portion of the pin mounted therein.

11. A draft control mechanism for a tractor having at least a three-point hitch for attachment of a ground-engaging implement to the rear of the tractor, wherein a force is applied to the implement when it engages the ground, the mechanism comprising:

at least two lower link arms, with one end of each lower link arm attached to the rear of the tractor, and with the other end thereof for attachment to an approximately vertical mast on the ground-engaging implement;

at least two lift arms, with one end of each lift arm attached to the rear of the tractor and with the other end of each lift arm attached to the respective lower link arms;

a load pin having a longitudinal axis and configured to generate a signal representative of the force applied thereto;

an upper link bracket with two parallel flanges attached to the rear of the tractor, with the pin supported within the upper link bracket and disposed between the flanges so the longitudinal axis is perpendicular to the direction of the force, wherein the pin further includes a pin extension protruding from one of the flanges, and further includes a wire which exits the pin extension to provide the signal representative of the force applied to the pin;

a sealing cover disposed over the pin extension and the wire, the sealing cover including a rotation stop for restricting the rotation of the pin; and a single upper link arm pivotally attached at one end to the implement at an attachment point above the attachment points for the lower link arms, the upper link arm pivotally mounted at its other end on the single pin so that the force is applied through the upper link arm to the pin.

12. A draft control mechanism as defined in claim 11 wherein the two flanges of the upper link bracket include a bushing within each flange surrounding a portion of the pin mounted therein.

13. A draft control mechanism as defined in claim 12, wherein the rotation stop comprises at least two generally flat opposing surfaces, the pin extension has two generally flat surfaces on opposite sides thereof, and the generally flat opposing surfaces of the cover are spaced apart so that the two generally flat surfaces of the pin extension fit in close adjacency between the opposing surfaces of the cover.

* * * * *